US012712422B2

(12) United States Patent
Angelo et al.

(10) Patent No.: US 12,712,422 B2
(45) Date of Patent: Aug. 18, 2026

(54) MULTI-COIL VOICE COIL MOTOR AND SYSTEMS FOR PROVIDING HAPTIC FEEDBACK

(71) Applicant: Valve Corporation, Bellevue, WA (US)

(72) Inventors: Brett Thomas Angelo, Redmond, WA (US); Lucas Allen Whipple, Seattle, WA (US)

(73) Assignee: Valve Corporation, Bellevue, WA (US)

(*) Notice: Subject to any disclaimer, the term of this patent is extended or adjusted under 35 U.S.C. 154(b) by 610 days.

(21) Appl. No.: 18/105,099

(22) Filed: Feb. 2, 2023

(65) Prior Publication Data

US 2023/0246531 A1 Aug. 3, 2023

Related U.S. Application Data

(60) Provisional application No. 63/306,393, filed on Feb. 3, 2022.

(51) Int. Cl.
*H02K 33/18* (2006.01)
*G08B 6/00* (2006.01)

(52) U.S. Cl.
CPC ............... *H02K 33/18* (2013.01); *G08B 6/00* (2013.01)

(58) Field of Classification Search
None
See application file for complete search history.

(56) References Cited

U.S. PATENT DOCUMENTS 6,681,025 B2 * 1/2004 Maekawa .............. H04R 9/063 381/396
10,609,488 B1 * 3/2020 Concessi ................. G06F 3/016
2002/0051557 A1 5/2002 Kobayashi et al.
2008/0165451 A1 * 7/2008 Binnard ............. H02K 41/0356 360/264.7

(Continued)

FOREIGN PATENT DOCUMENTS

CN 105144748 A * 12/2015 ............. H04R 9/041
JP 2007209845 A 8/2007

OTHER PUBLICATIONS

Machine translation of Rainin [CN-105144748-A] (Year: 2015).*

(Continued)

*Primary Examiner* — Bernard Rojas
(74) *Attorney, Agent, or Firm* — Lee & Hayes, P.C.

(57) ABSTRACT

A multi-coil voice coil motor (VCM) may be configured to be used as a haptic actuator for providing haptic feedback to a user. When implemented in a handheld controller having one or more controls, the multi-coil VCM may be configured to provide haptic feedback to a user of the controller. The multi-coil VCM may include a housing, multiple concentric coils, and a magnet coupled to the housing. The multiple concentric coils may include a first coil disposed on a first support coupled to the housing and a second coil disposed on a second support coupled to the housing, wherein the multiple concentric coils may have different diameters to allow for the concentricity of the coils. A system may include one or more haptic actuators, such as the multi-coil VCM, the haptic actuator(s) being configured to provide haptic feedback by causing at least a portion of a finger-operated control(s) to vibrate.

20 Claims, 5 Drawing Sheets

(SECTION A-A)

(56) References Cited

U.S. PATENT DOCUMENTS

| | | | |
|---|---|---|---|
| 2015/0169061 | A1 | 6/2015 | Odajima et al. |
| 2016/0088397 | A1 | 3/2016 | Sha et al. |
| 2017/0285848 | A1 | 10/2017 | Rosenberg et al. |
| 2021/0181845 | A1 | 6/2021 | Di Luca |
| 2021/0252388 | A1 | 8/2021 | Eric et al. |

OTHER PUBLICATIONS

PCT Search Report and Written Opinion mailed Apr. 14, 2023 for PCT application No. PCT/US2023/012292, 14 pages.

Extended European Search Report for European Application No. 23750210.9, dated Nov. 12, 2025, 8 pages.

* cited by examiner 600
602
604
606
608
610
112
114
616
618
620(1)
620(2)
620(3)
620(4)
622
624
626
628
630
100(1)
100(2)
X
Y

HANDHELD CONTROLLER 600

INPUT/OUTPUT DEVICE(S) 800

HAPTIC ACTUATOR(S) 802

805

COMMUNICATION INTERFACE(S) 804

PROCESSOR(S) 806

COMPUTER-READABLE MEDIA 808

OPERATING SYSTEM 810

NETWORK-COMMUNICATION MODULE 812

GAME-SESSION DATABASE 814

DEVICE-RECORD DATABASE 816

GAME-CONTROL INSTRUCTIONS 818

UNIVERSAL-CONTROL INSTRUCTIONS 820

MULTI-COIL VOICE COIL MOTOR AND SYSTEMS FOR PROVIDING HAPTIC FEEDBACK

CROSS REFERENCE TO RELATED APPLICATION

This application claims priority to commonly assigned U.S. Provisional Patent Application Ser. No. 63/306,393, entitled "MULTI-COIL VOICE COIL MOTOR AND SYSTEMS FOR PROVIDING HAPTIC FEEDBACK," and filed on Feb. 3, 2022, the entirety of which is incorporated herein by reference.

BACKGROUND

Handheld controllers are used in an array of architectures for providing input, for example, to a local or remote computing device. For instance, handheld controllers are utilized in the gaming industry to allow players to interact with a personal computing device executing a gaming application, such as a game console, a game server, the handheld controller itself, or the like. Furthermore, in order to simulate the sense of touch and motion, some handheld controllers are configured to provide haptic feedback to users.

It can be challenging to provide a wide variety of types of haptic feedback—particularly in small form factor devices where space is limited—using conventional haptic actuators. This is because conventional haptic actuators that are usable in a small form factor device have a limited dynamic range of output. For example, a traditional linear resonant actuator (LRA) may be suitable for providing a high-precision "tick" that is felt by the user's finger on a control of the controller, yet the LRA is nevertheless unable to provide a heavy, rumble-type haptic feedback because it tends to perform better at higher frequencies than at lower frequencies. Thus, a controller manufacturer may be forced to choose between providing one type of haptic feedback or another, but not both, because space is limited in a small form factor device. Not to mention, each additional haptic actuator adds to the component cost of the device. Moreover, due to the increasing complexity of controls—such as trackpads that include high-precision sensors for detecting touch, pressure, and other types of user input, positioning a haptic actuator very close to this sensitive componentry may be infeasible due to space constraints, and/or it may cause the sensors to mistakenly interpret the haptic actuator's output as spurious user input provided to the control. The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

DETAILED DESCRIPTION

Figure 1A:
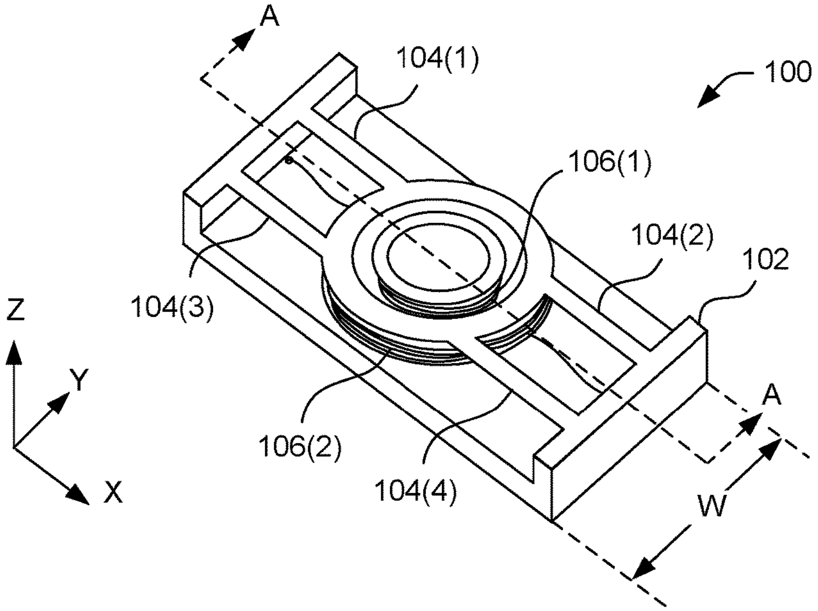
FIG. 1A is a perspective view of an example multi-coil voice coil motor (VCM) that is usable as a haptic actuator.

As mentioned above, handheld controllers are used in a range of environments and include a range of functionality. However, handheld controllers that implement conventional haptic actuators and/or arrangements thereof may have limited functionality in terms of the range of haptic feedback that can be provided to users.

Described herein are, among other things, a multi-coil voice coil motor (VCM) that is configured to be used as a haptic actuator (sometimes referred to herein as a "haptic transducer") for providing haptic feedback to a user. When implemented in a handheld controller having one or more controls, such as a handheld controller that is used to play a video game and/or to control other types of applications and/or programs, the multi-coil VCM may be configured to provide haptic feedback to a user of the controller.

In some instances, a handheld controller may include controls for controlling a game or an application running on the handheld controller itself (e.g., handheld gaming system that is substantially self-contained on the controller). In some instances, the handheld controller may include controls for controlling a remote device (e.g., a television, audio system, personal computing device, game console, etc.). The handheld controller may include one or more controls, including one or more front-surface controls on a front surface of a controller body of the handheld controller, one or more top-surface controls residing on a top surface of the controller body, one or more back-surface controls residing on a back surface of the controller body, and/or one or more controls on other surfaces of the controller body. In some instances, the multi-coil VCM (and/or another type of haptic actuator) may be coupled to at least one of these controls. In this manner, the multi-coil VCM (and/or the other type of haptic actuator) may be configured to provide haptic feedback by causing at least a portion of the control to vibrate. Additionally, or alternatively, the multi-coil VCM (and/or the other type of haptic actuator) may be configured to provide global haptic feedback that is not specific to a particular control by causing a mass within the controller body to move (e.g., vibrate, rotate, etc.).

The multiple coils of the multi-coil VCM allow for a single VCM to provide an increased dynamic range of output in the form of haptic feedback over a wider range of frequencies. This is because one of the coils may be configured to be driven within a first range of frequencies (e.g., a range of "high" frequencies at or near 500 Hertz (Hz)), and the other coil may be configured to be driven within a second range of frequencies that is different than the first range of frequencies (e.g., a range of "low" frequencies at or near 5 Hz). Thus, the multi-coil VCM may be configured to provide multiple types of haptic feedback, thereby providing for a wider variety of haptic feedback, as compared to a conventional, single-coil VCM. For example, when the disclosed multi-coil VCM is implemented in a handheld controller, the multi-coil VCM may be configured to provide (i) a high-precision "tick" via a first coil that is felt by the user's finger on a control that is coupled to the first coil, and (ii) a heavy, rumble-type haptic feedback via a second coil that is coupled to a mass within the controller body. In other words, the disclosed multi-coil VCM may perform well at both low frequencies and high frequencies, unlike conventional, single-coil VCMs that are traditionally used in small form factor devices. Furthermore, the disclosed multi-coil VCM is a more cost effective solution than multiple single-coil VCMs because magnets are a big cost driver of conventional VCMs. Moreover, the disclosed multi-coil VCM takes up less space than multiple single-coil VCMs.

An example multi-coil VCM that is configured to be used as a haptic actuator may include a housing, as well as multiple concentric coils and a magnet coupled to the housing. The multiple concentric coils may include a first coil disposed on a first support coupled to the housing and a second coil disposed on a second support coupled to the housing. The multiple concentric coils may have different diameters to allow for the concentricity of the coils within the housing of the multi-coil VCM.

Another example multi-coil VCM configured to be used as a haptic actuator may include a housing, a first coil disposed on a first support coupled to the housing, a second coil disposed on a second support coupled to the housing, and a magnet coupled to the housing. The first coil may have a first diameter, and the second coil may have a second diameter that is greater than the first diameter, the second coil surrounding the first coil and radially spaced a distance from the first coil.

An example controller may include a controller body, a control disposed on a surface of the controller body, and a haptic actuator disposed within the controller body and coupled to the control. The control may be configured to be operated by a finger, and the haptic actuator may be configured to provide haptic feedback by causing at least a portion of the control to vibrate. The haptic actuator may include multiple concentric coils including a first coil and a second coil having different diameters, and a magnet adjacent to the multiple concentric coils.

Also disclosed herein are systems including one or more finger-operated controls that are controllable by one or more fingers of a user, and one or more haptic actuators for providing haptic feedback by causing at least a portion of a finger-operated control(s) to vibrate. In these disclosed haptic feedback systems, a haptic actuator may be spaced laterally from the finger-operated control such that the haptic actuator is not disposed directly underneath the control that it is configured to vibrate. Instead, the haptic actuator may be positioned outside of a perimeter of the control, such as outside of a perimeter of a trackpad. This lateral spacing of the haptic actuator relative to the control mitigates instances where the output of the haptic actuator interferes with a sensor's ability to detect legitimate user input (e.g., touch input, pressure input, etc.) to the control. In a handheld controller implementation, the lateral spacing of the haptic actuator relative to the control may also allow for optimizing the weight distribution of the controller because the haptic actuator is not restricted to being positioned directly underneath the control that it is configured to vibrate. Rather, the haptic actuator may be strategically placed at a position within the controller body to balance, or distribute, the weight of the controller in a desired manner. The laterally-spaced haptic actuator may be coupled to the associated control via one or more members that are configured to transfer force generated by the haptic actuator to at least a portion of the control. The one or more members that couple the haptic actuator to the control may provide a mechanical advantage that allows a haptic actuator to provide haptic feedback at relatively low frequencies (e.g., a range of frequencies at or near 5 Hz).

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1A illustrates a perspective view of an example multi-coil voice coil motor (VCM) 100 that is usable as a haptic actuator (sometimes referred to herein as a "haptic transducer"). The multi-coil VCM 100 may include a housing 102. The housing 102 may provide a structure to which various components of the multi-coil VCM 100 are mounted. In some examples, the housing 102 encloses one or more components of the multi-coil VCM 100. In some examples, one or more components of the multi-coil VCM 100 are visible and/or accessible externally with respect to the housing 102, and, in this sense, the housing 102 may not enclose all of the components of the multi-coil VCM 100, in some examples. The housing 102 may function as a frame to which various components of the multi-coil VCM 100 are mounted in any suitable arrangement.

The housing 102 may be made of any suitable material or combination of materials including, without limitation, a plastic(s) (e.g., acrylonitrile butadiene styrene (ABS) plastic or another suitable polymer material), a metal(s), or the like. In some examples, the housing 102 is made of one or more pieces of injection-molded plastic. Particular portions of the housing 102 may be rigid (or semi-rigid) while other portions of the housing 102 may be compliant or flexible to allow one or more components of the multi-coil VCM 100, such as the coils, to move relative to other components that remain fixed in position with respect to the housing 102. For example, the housing 102 may include one or more arms 104 that are compliant in at least the Z-direction (the Cartesian coordinate system being represented in FIG. 1A). In the example of FIG. 1A, the housing 102 includes four arms 104(1), 104(2), 104(3), and 104(4), each extending in a lengthwise direction (e.g., in the X-direction) along the housing 102 and coupled to a coil of the multi-coil VCM 100, thereby supporting the coil while allowing the coil to move (e.g., vibrate) at least in the Z-direction. In some examples, movement of a coil of the multi-coil VCM 100 may be constrained to a single direction (e.g., the X-direction, the Y-direction, or the Z-direction).

The overall dimensions of the housing 102 may vary, depending on the implementation. In some examples, the housing 102 is a size that is suitable for mounting the multi-coil VCM 100 within a relatively small form factor device, such as a handheld controller, or any similar device. For example, the housing 102 may have a length (L) within a range of about 20 millimeters (mm) to 30 mm, a width (W) within a range of about 10 mm to 20 mm, and a height (H), or thickness, within a range of about 5 mm to 10 mm. These overall dimensions are merely exemplary, however, and the size of the housing 102 can be any suitable size. Furthermore, the shape of the housing 102 may vary, depending on the implementation. For example, the housing 102 may be cuboidal, such as the rectangular cuboid shape depicted in FIG. 1A, or any other suitable shape, such as cylindrical.

As mentioned, and as its name implies, the multi-coil VCM 100 may further include multiple coils 106. Although any suitable number of coils 106 (e.g., more than two coils) may be included in the multi-coil VCM 100, the example multi-coil VCM 100 that is depicted the figures includes two coils 106: a first coil 106(1) and a second coil 106(2). In this sense, the multi-coil VCM 100 may sometimes be referred to as a "dual-coil" VCM 100. Each coil 106 may be a coil of wire (e.g., copper wire) that is wound around a support 108 (or a coil holder) of, or within, the housing 102. For example, the first coil 106(1) may be disposed on a first support 108(1) coupled to the housing 102, and the second coil 106(2) may be disposed on a second support 108(2) coupled to the housing 102. In some examples, each support 108 is a tube (e.g., a cardboard tube, a plastic tube, etc.). In some examples, one or more of the supports 108, such as the first support 108(1), is a post, while one or more of the other supports 108, such as the second support 108(2), is a tube with a hollow center to receive the first support 108(1) and the associated first coil 106(1) therein.

Figure 1B:
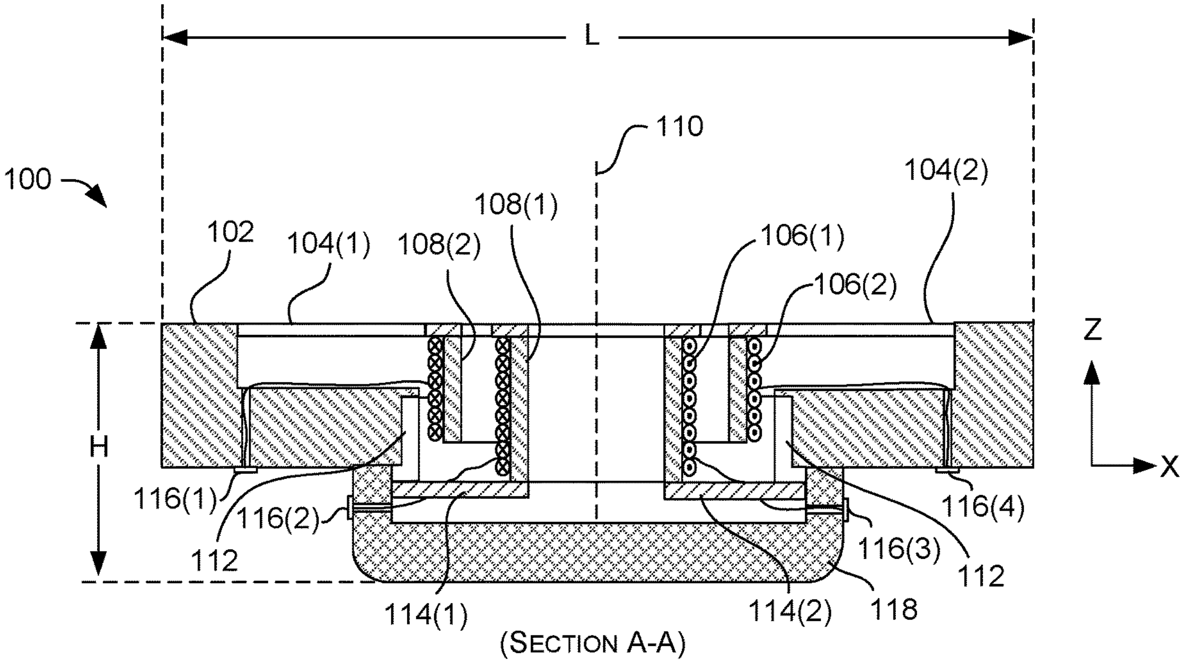
FIG. 1B is a side cross-sectional view of the example multi-coil VCM depicted in FIG. 1A taken along section line A-A.

In some examples, the coils 106 and the supports 108 on which the coils 106 are disposed may be cylindrical. For example, a cross-section of an individual support 108 may be a circle and a single turn of a coil 106 may be helical. It is to be appreciated, however, that the coils 106 and the supports 108 may be other non-cylindrical shapes, such as rectilinear. For instance, an individual support 108 may be a tube or a post having a cross-section that is a square, a rectangle, a triangle, or any other polygonal shape, and the coil 106 wrapped around such a support 108 may be a rectilinear helix that takes on a similar shape to that of the support 108. FIG. 1B, which is a cross-sectional view of the multi-coil VCM 100 taken along section line A-A, shows an axis 110 at the center of the housing 102 and extending in the Z-direction. In some examples, the coils 106 and the supports 108 are concentric with a point on the axis 110, meaning that respective cross-sections of the supports 108 and respective turns of the coils 106 that are at the same level (in the Z-direction) as the point on the axis 110 are concentric. In other words, the multiple coils 106 may be in a nested arrangement where the first coil 106(1) is an inner coil, and the second coil 106(2) is an outer coil that surrounds the first (inner) coil 106(1), as depicted in FIGS. 1A and 1B. Said another way, the coils 106 at least partially overlap in the Z-direction (i.e., along the axis 110), and the supports 108 also overlap in the Z-direction (i.e., along the axis 110). It is to be appreciated that "concentric" and "nested," as used herein, may be interpreted as "semi-concentric" or "semi-nested" in the sense that some, but not the entirety, of the coils 106 and/or the supports 108 overlap in the Z-direction. That said, in some examples, the coils 106 and/or the supports 108 may be fully-concentric or fully-nested, meaning that the entirety of the coils 106 and/or the supports 108 overlap in the Z-direction.

Figure 2:
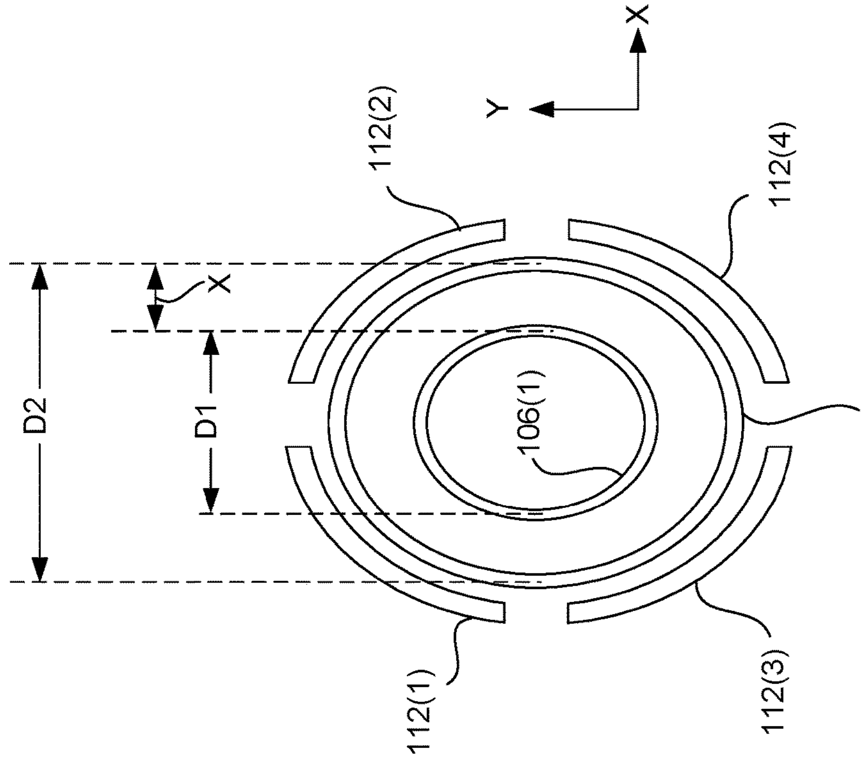
FIG. 2 is a schematic diagram depicting multiple coils and a magnet of an example multi-coil VCM from a top view.

FIG. 2 is a schematic diagram depicting multiple coils 106(1) and 106(2) and a magnet 112 of an example multi-coil VCM 100, as seen from a top view. From this top view, FIG. 2 illustrates that the multiple coils 106(1) and 106(2) have different diameters, D, to allow for the concentricity (e.g., nested arrangement) of the coils 106 within the housing 102 of the multi-coil VCM 100. For example, the first (inner) coil 106(1) may have a first diameter, D1, and the second (outer) coil 106(2) may have a second diameter, D2, that is different (e.g., greater) than the first diameter, D1. The difference between the diameters, D1 and D2, of the multiple coils 106 can vary, depending on the implementation. In some examples, the diameters, D1 and D2, of the multiple coils 106 may differ by about 1 mm to 5 mm. Accordingly, because the coils 106 are concentric (e.g., one coil 106(1) nested within the other coil 106(2)), the second coil 106(2) may be radially spaced a distance, X, from the first coil 106(1), and vice versa. Accordingly, the distance, X, can be about 1 mm to 5 mm, in at least one example. The second coil 106(1) being "radially" spaced from the first coil 106(1) means that the second coil 106(2) is spaced farther from the axis 110 than the first coil 106(1) is spaced from the axis 110, and, hence, the second coil 106(2) has a larger diameter, D2, than the diameter, D1, of the first coil 106(1). There may also be an air gap between the first coil 106(1) and the second coil 106(2) (e.g., the second coil 106(2) is not contacting the first coil 106(1)) in order to allow for independent movement of the individual coils 106.

The magnet 112 of the multi-coil VCM 100 may be coupled to the housing 102, as depicted in FIG. 1B. Additionally, or alternatively, the magnet 112 may be coupled to a backplate 118, and the backplate 118 may be coupled to the housing 102. In some examples, the backplate 118 may be considered to be part of the housing 102. The backplate 118 may be made of one or more magnetic materials, such as steel (e.g., ferritic stainless steel), iron, nickel, or any other suitable metal, or non-metal, material with magnetic properties. The backplate 118 may be disposed behind or underneath the magnet 112 and/or the backplate 118 may encompass the magnet 112. The backplate 118 may provide a path for a magnetic field to travel through. In some examples, the magnet 112 and the backplate 118 form a magnetic field assembly configured to direct and/or contain a magnetic field. In some examples, the magnet 112 is fixed within the housing 102, meaning that the magnet 112 is not configured to move relative to the housing 102. It is to be appreciated, however, that the multi-coil VCM 100 may be implemented as either a "moving coil" design or a "moving magnet" design. The example multi-coil VCM 100 is an example of a moving coil design where the magnet 112 remains fixed within the housing 102 and the coils 106 are movable relative to the magnet 112 and/or the housing 102. In some examples, the magnet 112 comprises one or more portions of permanent magnetic material (e.g., iron) that surround the multiple concentric coils 106. In the example schematic diagram of FIG. 2, the magnet 112 (as seen from a top view) is partitioned into four curved portions 112(1), 112(2), 112(3), and 112(4) of permanent magnetic material. It is to be appreciated, however, that the magnet 112 may be a continuous, annular piece of permanent magnetic material, in some examples. Alternatively, the magnet 112 may be partitioned into any suitable number of curved portions of permanent magnetic material (e.g., fewer than four portions or greater than four portions), the portions of the magnet 112 being arranged in a substantially annular shape to substantially surround the coils 106. Because the one or more portions of the magnet 112 surround the multiple concentric coils 106, the diameter of the annular-shaped magnet 112 (or portions thereof) may be greater than the largest diameter coil 106; in this case, the magnet 112 has a diameter that is greater than the diameter, D2, of the second (outer) coil 106(2). There may also be an air gap between the second (outer) coil 106(2) and the magnet 112 (e.g., the magnet 112 is not contacting the second coil 106(2)) in order to allow for movement of the coils 106.

The second coil 106(2) and the second support 108(2) may be suspended within the housing 102 by any suitable supporting mechanism. In the example of FIGS. 1A and 1B, the arms 104 suspend the second coil 106(2) and the second support 108(2) within the housing 102, and because the arms 104 are compliant, the arms 104 allow the second coil 106(1) to move (e.g., vibrate) in at least one direction (e.g., the Z-direction). In some examples, the arms 104 are one or more second arms, and the housing 102 may further include one or more first arms 114, as depicted in the cross-sectional view of FIG. 1B. The one or more first arms 114 may be compliant in at least one direction, such as the Z-direction. In the example of FIG. 1B, the housing 102 includes two first arms 114(1) and 114(2), each arm 114 extending in a lengthwise direction (e.g., in the X-direction) along the housing 102. Accordingly, the first coil 106(1) and the first support 108(1) may be suspended within the housing 102 by the first arm(s) 114. In the example of FIGS. 1A and 1B, the first coil 106(1) and the first support 108(1) are supported by the first arm(s) 114 from a bottom of the first coil 106(1) and the first support 108(1), while the second coil 106(2) and the second support 108(2) are supported by the second arm(s) 104 from a top of the second coil 106(2) and the second support 108(2). In some these arms 104 and 114 may be considered to be part of the "support" of a respective coil 106.

Figure 3:
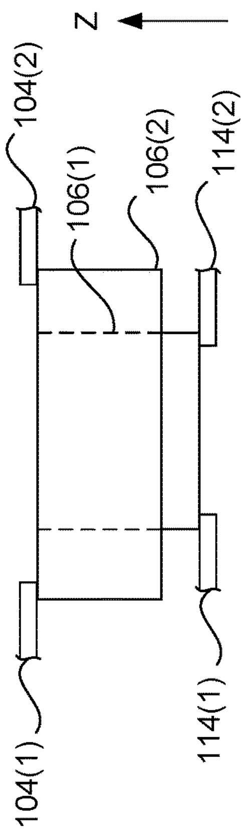
FIG. 3 is a schematic diagram depicting an example of supporting multiple coils of an example multi-coil VCM from a side view.
Figure 4:
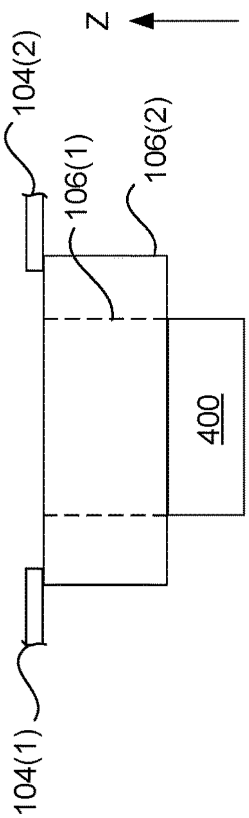
FIG. 4 is a schematic diagram depicting another example of supporting multiple coils of an example multi-coil VCM from a side view.
Figure 5:
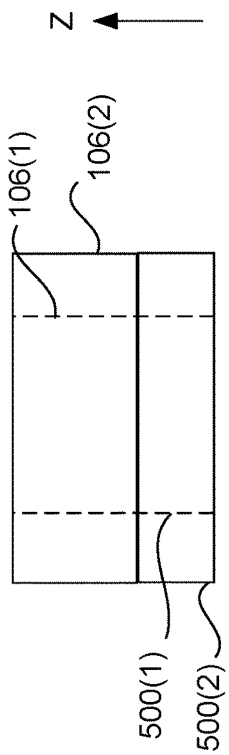
FIG. 5 is a schematic diagram depicting another example of supporting multiple coils of an example multi-coil VCM from a side view.

FIGS. 3-5 illustrate various examples of supporting multiple coils 106 of an example multi-coil VCM 100 from a side view. FIG. 3 depicts the example of FIG. 1B, which is to support the first coil 106(1) from the bottom by one or more first arms 114 coupled to a bottom of the first coil 106(1) and/or to a bottom of the first support 108(1), and to support (or suspend) the second coil 106(2) from the top by one or more second arms 104 coupled to a top of the second coil 106(2) and/or a top of the second support 108(2). In this example, the arms 114 are horizontal in orientation and may be compliant in at least the Z-direction to allow the first coil 106(1) and the second coil 106(2) to move (e.g., vibrate) independently in the Z-direction. That is, movement of the first coil 106(1) is independent of (or not dependent on) the movement of the second coil 106(2), and vice versa. In this manner, the movement of each coil 106 can be controlled individually and selectively to provide the desired haptic feedback.

FIG. 4 is a schematic diagram depicting another example of supporting multiple coils 106 of an example multi-coil VCM 100 from a side view. In the example of FIG. 4, the second coil 106(2) is supported (or suspended) from the top by one or more arms 104 coupled to a top of the second coil 106(2) and/or a top of the second support 108(2), and the first coil 106(1) is supported from the bottom by a pedestal 400 that is coupled to a bottom of the first coil 106(1) and/or to a bottom of the first support 108(1), the pedestal 400 being compliant in at least the Z-direction. For example, the pedestal 400 may be coupled to an inner bottom surface of the housing 102 and may be made of a sponge-like material (e.g., compliant foam) that can be squished downward (i.e., in the negative Z-direction) and/or stretched upward (i.e., in the positive Z-direction), thereby allowing the first coil 106(1) to move (e.g., vibrate) in the Z-direction, and to do so independently of the movement of the second coil 106(2).

FIG. 5 is a schematic diagram depicting another example of supporting multiple coils 106 of an example multi-coil VCM 100 from a side view. In the example of FIG. 5, the first coil 106(1) is supported from the bottom by a first pedestal 500(1) that is coupled to a bottom of the first coil 106(1) and/or to a bottom of the first support 108(1), and the second coil 106(2) is supported from the bottom by a second pedestal 500(2) that is coupled to a bottom of the second coil 106(2) and/or to a bottom of the second support 108(2). In this example, the first pedestal 500(1) may be nested within the second pedestal 500(2), which may have an annular shape to accommodate the first pedestal 500(1) within the second pedestal 500(2), and the multiple pedestals 500 may be coupled to an inner bottom surface of the housing 102 to form multiple concentric pedestals 500(1) and 500(2), similar to the concentric (e.g., nested) arrangement of the coils 106 and the supports 108. These pedestals 500 may be made of a sponge-like material (e.g., compliant foam) that can be squished downward (i.e., in the negative Z-direction) and/or stretched upward (i.e., in the positive Z-direction), thereby allowing each coil 106 to move (e.g., vibrate) in the Z-direction independently of the other coil 106.

It is to be appreciated that the multi-coil VCM 100 may be implemented with alternative designs in terms of the relative positioning of component parts and/or in terms of the way in which the coils 106 are supported. FIGS. 1A, 1B, and 2-5 provide example ways of implementing the multi-coil VCM 100, but it is to be appreciated that these are merely example, non-limiting designs. So long as the multi-coil VCM 100 includes multiple concentric coils 106 and an adjacent magnet, the multi-coil VCM 100 may be implemented as a "moving coil" design, a "moving magnet" design, with a magnet 112 surrounding the coils 106, with the coils 106 surrounding the magnet 112 (e.g., a permanent magnet core), or any other suitable design. Furthermore, the coils 106 can be supported in any suitable fashion, such as using supports (e.g., 108) coupled to compliant arms (e.g., the arms 104, 114), compliant pedestals (e.g., pedestals 400, 500), rails, or any other suitable type of supporting structure.

Returning with reference to FIG. 1B, electrical contacts 116 may be disposed on an external surface of the housing 102 and/or the backplate 118 and coupled to leads of the coils 106 in order to drive the coils 106 during operation of the multi-coil VCM 100. For example, a pair of contacts 116(2) and 116(3) may be coupled to positive and negative leads of the first coil 106(1), and another pair of contacts 116(1) and 116(4) may be coupled to positive and negative leads of the second coil 106(2). An individual coil 106 may be driven by an amplifier, such as a Class-D amplifier, or any other suitable type of amplifier. In some examples, a processor(s) may send a control signal to cause the amplifier to drive an individual coil 106 of the multi-coil VCM 100 at a particular frequency, thereby causing the coil 106 to vibrate (e.g., up and down in the Z-direction) at the particular frequency. In some examples, an individual coil 106, of the multiple coils 106(1) and 106(2), may be associated with a channel, and the processor(s) may select the channel in order to drive the particular coil 106. For example, the dual-coil VCM 100 depicted in FIGS. 1A and 1B may be driven using two channels, a first channel being used to drive the first coil 106(1) and a second channel being used to drive the second coil 106(2). Although each coil 106 is configured to be driven independently of the other coil 106, it is to be appreciated that, in some examples, the multiple coils 106 can be driven simultaneously or contemporaneously, and at different frequencies, which may involve using separate amplifiers for the separate coils.

The multi-coil VCM 100 is configured to function as an electromagnet. For example, when electrical current flows through an individual coil 106, the flow of electrical current produces a magnetic field surrounding the coil 106. Because a magnet 112 is adjacent to (e.g., within a threshold distance of) the coil 106 and surrounds the coil 106, the interaction between the magnet 112 and the magnetic field generated by the electrical current flowing through the coil 106 causes the coil 106 to move relative to the magnet 112 because the magnet 112 is fixed and the coil 106 is allowed to move relative to the magnet 112. The direction of movement of the coil 106 may be constrained to the Z-direction, as mentioned above. Whether the coil 106 moves in the positive Z-direction or the negative Z-direction depends on the north and south polar orientation of the magnet 112 and the magnetic field surrounding the coil 106. The polar orientation can be switched by reversing the flow of the electrical current through the coil 106. When the flow of electrical current switches directions repeatedly, and at a particular frequency, the coil 106 moves back and forth (vibrates) (e.g., in the Z-direction) at the particular frequency.

In order to use the multi-coil VCM 100 as a haptic actuator, the multi-coil VCM 100, and more specifically, the coil(s) 106 thereof, may be coupled to a mass. For example, a top of the support(s) 108 may be coupled to a respective mass, such as with an adhesive, thereby coupling the coil(s) 106 to the mass(es). The vibration of the mass caused by the vibration of the coil(s) 106 provides haptic feedback because the vibration of the mass can be felt by a user. As mentioned above, the multi-coil VCM 100 may be coupled to a finger-operated control (e.g., a trackpad) of a handheld controller, and, in this implementation, the multi-coil VCM 100 may be configured to provide haptic feedback by causing at least a portion of the control to vibrate. Accordingly, in this example, the portion of the finger-operated control represents the mass to which the multi-coil VCM 100 is coupled. In some examples, each coil 106 may be coupled to a different mass and may be configured to vibrate the respective mass independently. For example, the first coil 106(1) may be coupled to a control (e.g., a trackpad) of a handheld controller, and the second coil 106(2) may be coupled to a different mass within the controller body of the controller. In this example, the first coil 106(1) may be configured to be driven within a first range of frequencies (e.g., a range of frequencies at or near 500 Hz) to provide a high-precision "tick(s)" or "click(s)" that is/are felt by the user's finger on the control (e.g., the trackpad). This type of haptic feedback may be provided for trackpad mousing, for example. Meanwhile, the second coil 106(2) may be configured to be driven within a second range of frequencies that is different than the first range of frequencies (e.g., a range of frequencies at or near 5 Hz) to provide low-precision, heavy, rumble-type haptic feedback. This type of haptic feedback may be provided during gameplay to simulate the feeling of a player-controlled character falling down, an impact of a weapon, a car crash, or the like. In exome examples, the second range of frequencies may overlap the first range of frequencies, while in other examples, the second range of frequencies may not overlap the first range of frequencies (e.g., the frequency ranges may be mutually exclusive). In either case, a highest frequency of the first range of frequencies may be greater than a highest frequency of the second range of frequencies if the first coil 106(1) is configured to provide higher precision haptic feedback while the second coil 106(2) is configured to provide lower precision haptic feedback.

Figure 6:
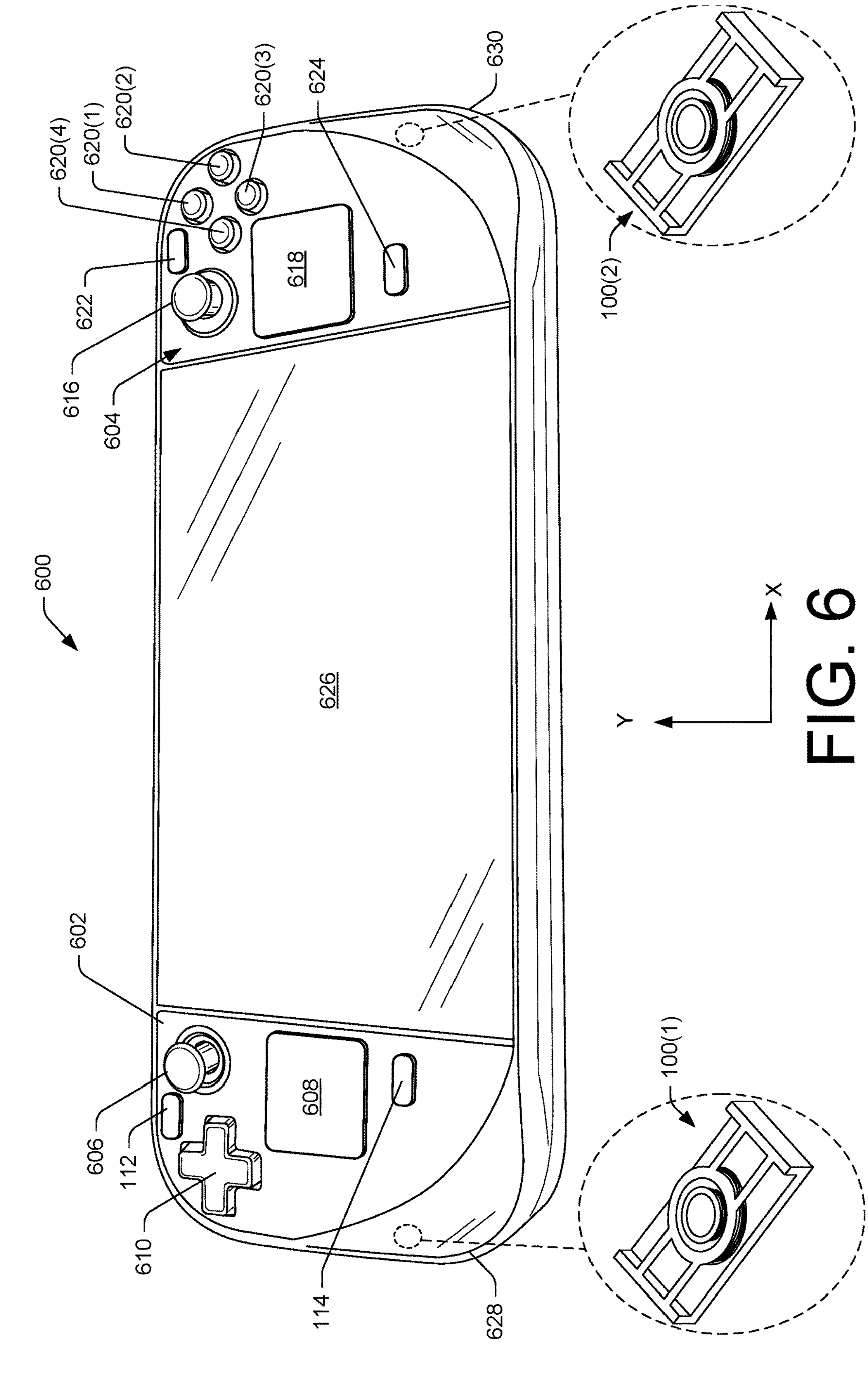
FIG. 6 is a front perspective view of an example handheld controller that includes, in part, one or more haptic actuators to provide haptic feedback to a user of the handheld controller.

FIG. 6 illustrates a front view of an example controller 600 according to an embodiment of the present disclosure. The controller 600 may be considered to be handheld if it is operated by the hands of a user, whether or not the entire controller 600 is supported by or within the hands of the user. However, in accordance with various embodiments described herein, the terms "device," "handheld device," "handheld game device," "handheld console," "handheld game console," "controller," and "handheld controller" may be used interchangeably herein to describe any device like the controller 600.

The controller 600 may include a controller body 602 having a front surface 604. The controller body 602 may further include a back surface (or back), a top surface (or top edge, or top), a bottom surface (or bottom edge, or bottom), a left surface (or left edge, or left), and a right surface (or right edge, or right). Accordingly, the controller body 602 may be a cuboid. The front surface 604 and the back surface may be relatively large surfaces compared to the top, bottom, left, and right surfaces.

As illustrated in FIG. 6, the front surface 604 of the controller body 602 may include a plurality of controls (e.g., finger-operated controls) configured to receive input of the user. Touch data generated by the controls may be used to detect a presence, location, and/or gesture of a finger of a user operating the controller 600. In some instances, the front surface 604 of the controller body 602 may include one or more front-surface controls that are, in some instances, controllable by one or more thumbs of the user operating the controller 600. The handheld controller 600 may further include one or more top-surface controls residing on a top surface (or top edge) of the controller body 602. Additionally, or alternatively, the handheld controller 600 may include one or more back-surface controls residing on the back surface of the controller body 602 and operable by fingers of a left hand and/or a right hand of the user. Additionally, or alternatively, the handheld controller 600 may include one or more left-surface controls and/or right-surface controls residing on respective left and right surfaces of the controller body 602.

The front-surface controls may include one or more trackpads, trackballs, joysticks, buttons, directional pads (D-pads), or the like. For example, the front surface 604 may include a left joystick 606, a left trackpad 608, and/or a left D-pad 610 controllable by a left thumb of the user. In some embodiments, the front surface 604 may include additional left buttons controllable by the left thumb, such as the button 612 and the button 614. The front surface 604 may also include a right joystick 616, a right trackpad 618, and/or one or more right buttons 620(1)-(4) (e.g., X, Y, A, and B buttons) controllable by a right thumb of the user. In some embodiments, the front surface 604 may include additional right buttons controllable by the right thumb, such as the button 622 and the button 624. However, the front surface 604 may include other controls, such as tilting button(s), trigger(s), knob(s), wheel(s), and/or trackball(s), and the plurality of controls may be configured to receive input from any combination of thumbs and/or fingers of the user. In instances where the controller 600 includes trigger(s), the trigger(s) may be multi-direction triggers configured to be pushed away from the controller 600 and pulled towards the controller 600. Moreover, the controller 600 may include paddles, panels, or wings, that are configured to be pushed and/or pulled. The panels may be used to provide additional game controls to the controller 600, such as shifting in a racing game (e.g., pushing may downshift and pulling may upshift).

In some embodiments, the trackpads 608 and 618 are quadrilateral-shaped trackpads. For example, the trackpads 608 and 618 may be generally square-shaped trackpads. Furthermore, the quadrilateral-shaped trackpads 608 and 618 may have rounded corners. Additionally, as shown in FIG. 6, a straight side edge of each trackpad 608 and 618 is aligned with (e.g., parallel to) the side (e.g., left and right) edges of a display 626 in a center of the controller body 602 on the front surface 604 of the controller body 602.

The controller body 602 may further includes a left handle 628 and a right handle 630 by which the user may hold the controller 600 via right and left hands of the user, respectively. Holding the left handle 628 in the left hand may provide access to the left joystick 606, the left trackpad 608, and/or the left D-pad 610. Holding the right handle 630 in the right hand may provide access to the right joystick 616, the right trackpad 618, and/or the one or more right buttons 620(1)-(4).

FIG. 6 further illustrates the controller 600 may further include one or more haptic actuators, such as a first multi-coil VCM 100(1) and a second multi-coil VCM 100(2), as described herein. The individual multi-coil VCMs 100 may be disposed within the controller body 602 such that the multi-coil VCMs 100 are hidden from view. In some examples, the first multi-coil VCM 100(1) is disposed within the left handle 628 of the controller body 602, and the second multi-coil VCM 100(2) is disposed within the right handle 630 of the controller body 602. The orientation of the multi-coil VCMs 100(1) and 100(2) depicted in FIG. 6 does not necessarily represent the orientation that the multi-coil VCMs 100(1) and 100(2) would be in while disposed within the controller body 600. For example, the bottom of the housing 102 of the first multi-coil VCM 100(1) may be mounted to a left, inner side wall of the controller body 602 such that the top of the housing 102 of the first multi-coil VCM 100(1) is substantially facing the right side of the controller body 602. Likewise, the bottom of the housing 102 of the second multi-coil VCM 100(2) may be mounted to a right, inner side wall of the controller body 602 such that the top of the housing 102 of the second multi-coil VCM 100(2) is substantially facing the left side of the controller body 602. In other words, the multi-coil VCMs 100 may be sideways oriented within the controller body 602 such that the direction of vibration of the coils 106 is in the X-Y plane (e.g., in the X-direction) shown in FIG. 6.

In some examples, an individual multi-coil VCM 100 is coupled to a finger-operated control of the controller 600 in order to provide haptic feedback to a user while a finger of the user is touching the control. For example, the first multi-coil VCM 100(1) may be coupled to a finger-operated control positioned to the left of the display 626, such as the left trackpad 608. More specifically, a coil 106 of the first multi-coil VCM 100(1), such as the first coil 106(1), may be coupled to a finger-operated control positioned to the left of the display 626. In this manner, the first multi-coil VCM 100(1) may be configured to provide haptic feedback by causing at least a portion of the finger-operated control to vibrate. For example, movement of the first coil 106(1) of the first multi-coil VCM 100(1) may cause at least a portion of the left trackpad 608 to vibrate, in at least one example. The second multi-coil VCM 100(2) may be coupled to a finger-operated control positioned to the right of the display 626, such as the right trackpad 618. More specifically, a coil 106 of the second multi-coil VCM 100(2), such as the first coil 106(1), may be coupled to a finger-operated control positioned to the right of the display 626. In this manner, the second multi-coil VCM 100(2) may be configured to provide haptic feedback by causing at least a portion of the finger-operated control to vibrate. For example, movement of the first coil 106(1) of the second multi-coil VCM 100(2) may cause at least a portion of the right trackpad 618 to vibrate, in at least one example. These vibrations may be felt by a user whose fingers are touching the respective controls (e.g., the trackpads 608 and 618). The respective second coils 106(2) of the multi-coil VCMs 100 may be coupled to respective masses within the controller body 602 in order to provide additional haptic feedback to a user of the controller 600. For example, the respective first coils 106(1) of the multi-coil VCMs 100(1) and 100(2) may be configured to provide high-precision "ticks" that are felt by the user's fingers (e.g., thumbs) on the trackpads 608, 618, and the respective second coils 106(2) of the multi-coil VCMs 100(1) and 100(2) may be configured to provide low-precision, heavy, rumble-type haptic feedback.

In some examples, the controller 600 may include one or more other types of haptic actuators in lieu of, or in addition to, the multi-coil VCMs 100(1) and 100(2) depicted in FIG. 6. For example, the controller 600 may include, without limitation, one or more linear resonant actuators (LRAs), one or more eccentric rotating masses (ERMs), one or more solenoids, one or more single-coil VCMs, and/or any other suitable type of haptic actuator. An individual haptic actuator may be configured to vibrate or resonate in any suitable direction with respect to the controller body 602 of the controller 600, such as the X, Y, and/or Z direction, where the Z-direction, in this context, is orthogonal to the front surface 604 of the controller body 602, and where the X and Y directions within a plane that is parallel to the front surface 604 of the controller body 602.

An individual haptic actuator of the controller 600, such as the multi-coil VCM 100 described herein, may be configured to provide haptic feedback (e.g., by vibrating, pulsing, etc.) in response to one or more criteria being met. An example criterion may be met if an amount of force of a press on a control (e.g., the left trackpad 608, the right trackpad 618, etc.) satisfies a threshold. Said another way, the criterion may be met if force data provided by a pressure sensor associated with the control being pressed includes one or more values (e.g., one or more force sensing resistor (FSR) values, capacitance values, etc.) that satisfy a threshold, the force data indicative of an amount of force of a press on the control. Thus, if a user presses hard enough on the control (e.g., the left trackpad 608, the right trackpad 618, etc.) to register a press input event, the user may feel haptic feedback in the form of a tactile, vibration of the control (e.g., the cover of the control). Another example criterion may be met if touch data provided by a touch sensor associated with the control being touched indicates that a finger has touched the control and subsequently dragged a predetermined distance across the control while touching the cover. In this way, a user can feel a tactile, vibration of the control whenever the user drags a finger a predetermined distance across the control (e.g., the left trackpad 608, the right trackpad 618, etc.), which may be indicative of toggling between user interface elements on the display 626. These are merely example criteria that may be met in order to trigger haptic feedback via the haptic actuator(s) of the controller 600, and it is to be appreciated that other criterion may be evaluated for triggering haptic feedback. A processor (s) of the controller system disclosed herein may be configured to process touch data, force data, and/or other sensor data from a touch sensor, a pressure sensor, and/or another sensor associated with a control in order to determine if one or more criteria are met, and, if so, send a control signal to the haptic actuator(s) (e.g., via an amplifier) to provide haptic feedback. The control signal may specify a frequency (e.g., a value in Hz) and/or a level of electrical current (e.g., a value in Amperes (Amps)) to drive the haptic actuator(s) at the specified level (e.g., frequency).

Figure 7:
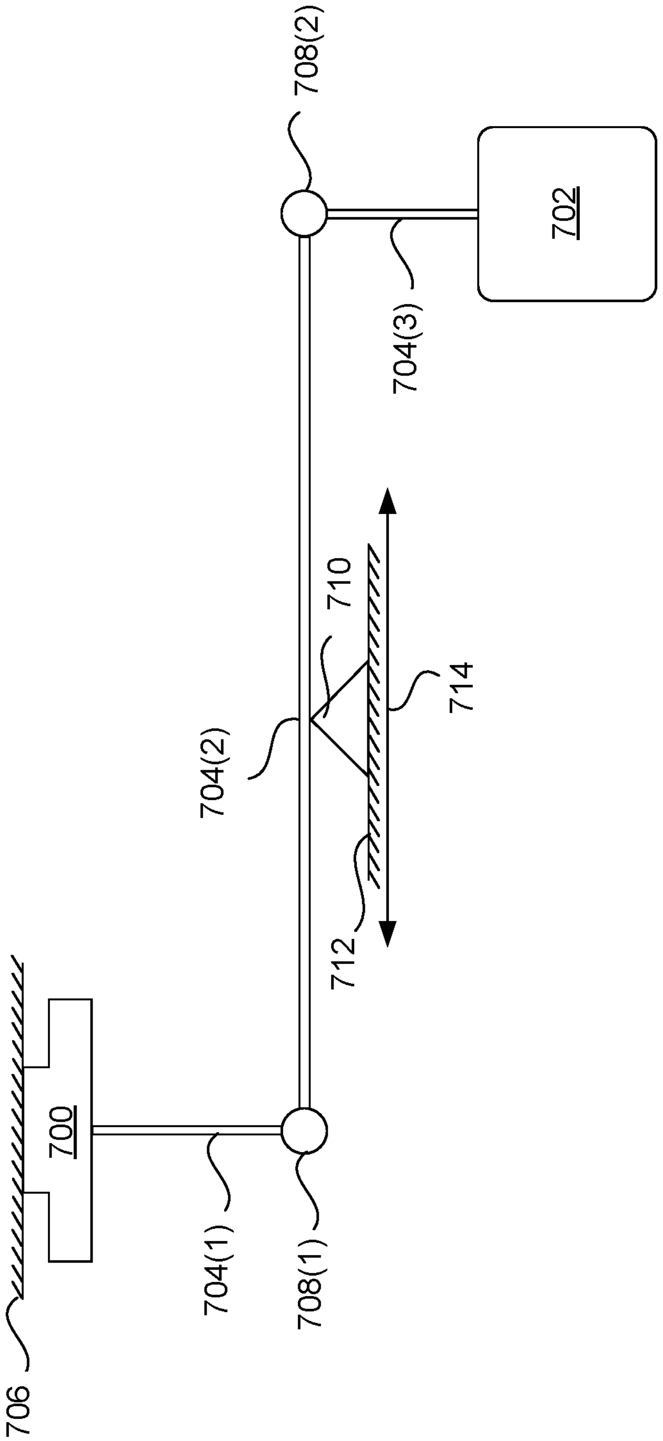
FIG. 7 is a schematic diagram depicting a haptic actuator coupled to a finger-operated control via one or more members that are configured to transfer force generated by the haptic actuator to at least a portion of the control.

An individual haptic actuator of the controller 600 may be disposed at any suitable position or location within the controller body 602, oriented in any suitable orientation, and/or coupled to a finger-operated control of the controller 600 in various ways. FIG. 7 is a schematic diagram depicting a haptic actuator 700 coupled to a finger-operated control 702 via one or more members 704 that are configured to transfer force generated by the haptic actuator 700 to at least a portion of the control 702. The haptic actuator 700 may represent any suitable type of haptic actuator, as described herein. In some examples, the haptic actuator 700 may represent a multi-coil VCM 100, as described herein. In the example of a multi-coil VCM 100, a coil 106, such as the first coil 106(1), may be coupled to a first member 704(1) of the one or more members 704 to cause movement of the first member 704 in response to movement of the coil 106. In general, when the haptic actuator 700, or a component thereof, is vibrating, the force generated by the vibration is transferred to the first member 704(1), thereby causing movement of the first member 704(1), such as translational movement in a first direction. The haptic actuator 700 may be mounted to a structure 706 in order to maintain the haptic actuator 700 at a fixed position whilst a component of the haptic actuator 700 vibrates and causes the movement of the first member 704(1). In some examples, the structure 706 in FIG. 7 represents a side wall (e.g., an inner, side wall) of the controller body 602 of the controller 600 depicted in FIG. 6.

In some examples, the finger-operated control 702 represents a trackpad, such as the left trackpad 608 or the right trackpad 618 shown in FIG. 6, although it is to be appreciated that the control 702 may represent any suitable type of control, such as a joystick, a D-pad, a button, or the like. The one or more member 704 may couple the haptic actuator 700 to the finger-operated control 702 and may transfer force generated by the haptic actuator 700 to at least a portion of the control 702. The first member 704(1) may be coupled to the second member 704(2) via a first joint 708(1), and the second member 704(2) may be coupled to the third member 704(3) via a second joint 708(2). The third member 704(3) may be coupled to the finger-operated control 702, such as a trackpad. It is to be appreciated that the haptic actuator 700 may be coupled to the finger-operated control 702 via a fewer number of members 704 (e.g., a single member 704, two members 704, etc.) or a greater number of members 704 (e.g., more than three members 704). In some examples, an individual joint 708 may be a pivot that allows a member 704 to rotate about the pivot. In some examples, an individual joint 708 couples two members 704 together and is configured to move in a translational sense. For example, the second member 704(2) may be configured to pivot (or rotate) about a pivot point 710 such that translational movement of the first member 704(1) causes a rotational movement of the second member 704(2), which, in turn, causes a translational movement of the third member 704(3), which, in turn, causes a translational movement of at least a portion of the control 702. The pivot point 710 may be mounted to a structure 712. In some examples, the structure 712 and/or the pivot point 710 is/are fixed at any suitable location along the second member 704(2), such as at a center of the second member 704(2). In some examples, the structure 712 and/or the pivot point 710 is/are movable in a direction of the arrow 714 (e.g., lengthwise along the second member 704(2)). In these examples, the pivot point 710 can be moved (e.g., translated) to different positions along the second member 704(2) in order to tune or adjust a ratio of force and displacement. That is, the ratio of force and displacement can be adjusted by moving the pivot point 710 and/or the structure 712 from a first position to a second position along the second member 704(2). This movement of the pivot point 710 and/or the structure 712 may occur at a time of manufacturing a device (e.g., the controller 600) that includes the haptic actuator 700 and the finger-operated control 702, such as for calibrating the ratio of force and displacement during manufacture of the device. Additionally, or alternatively, the movement of the pivot point 710 and/or the structure 712 may be controlled by an actuator (not shown) of the device after the device (e.g., the controller 600) has been manufactured. In yet other examples, the members 704 may be rigidly coupled together and may be configured to collectively translate in coordination with movement of the haptic actuator 700, which causes a corresponding movement of at least a portion of the control 702. For example, all three members 704 may move in one direction at the same time, and in an opposite direction at the same time. Accordingly, any suitable type of linkage of the multiple members 704 may allow for transferring force generated by the haptic actuator 700 to at least a portion of the control 702.

As depicted in FIG. 7, the haptic actuator 700 may be spaced laterally from the finger-operated control 702 such that the haptic actuator 700 is not disposed directly underneath the control 702 that it is configured to vibrate. For example, FIG. 7 may represent a top (or a bottom) view of the haptic actuator 700 positioned relative to the control 702 (e.g., looking down on the control 702 from the top, or looking up at the control 702 from the bottom). From this view, it can be appreciated that the haptic actuator 700 is positioned outside of a perimeter of the control 702, such as outside of a perimeter of a square-shaped trackpad. As noted elsewhere herein, the control 702, such as a trackpad, may include sensitive componentry, such as a touch sensor(s) (e.g., a capacitive touch sensor), a pressure sensor(s) (e.g., a FSR), or the like. The lateral spacing of the haptic actuator 700 relative to the control 702, as depicted in FIG. 7, positions the haptic actuator 700 away from the sensitive componentry of the control 702 to mitigate instances where the output of the haptic actuator 700 interferes with a sensor's ability to detect legitimate user input (e.g., touch input, pressure input, etc.) to the control 702. In other words, the sensor(s) associated with the control 702 may detect spurious user input less frequently using the arrangement shown in FIG. 7.

In a handheld controller implementation, the lateral spacing of the haptic actuator 700 relative to the control 702 may also allow for optimizing the weight distribution of the controller 600 because the haptic actuator 700 is not restricted to being positioned directly underneath the control 702 that it is configured to vibrate. Rather, the haptic actuator 700 may be strategically placed at a position within the controller body 602 to balance, or distribute, the weight of the controller 600 in a desired manner. Despite being positioned laterally away from the control 702, the one or more members 704 may be configured to transfer force generated by the haptic actuator 700 to at least a portion of the control 702 to provide haptic feedback that is specific to, and/or localized at, the control 702.

The one or more members 704 may also provide a mechanical advantage that allows a haptic actuator 700 to provide haptic feedback at relatively low frequencies. That is, if the haptic actuator 700 performs well in providing haptic feedback at relatively high frequencies (e.g., at or near 500 Hz), yet the haptic actuator 700 does not, by itself, perform well in providing haptic feedback at relatively low frequencies (e.g., at or near 5 Hz) due to the relatively small size of the haptic actuator 700 and/or the relatively small displacement of the actuating mechanism (e.g., the coil(s) of a VCM, such as the coil(s) 106 of the multi-coil VCM 100 described herein), the member(s) 704 may allow for larger displacements.

Although the haptic actuator 700 of FIG. 7 is shown as being directly coupled to a single member 704(1), it is to be appreciated that the haptic actuator 700 may be directly coupled to more than one member, which may allow for actuating multiple separate masses. For example, if the haptic actuator 700 is implemented as the multi-coil VCM 100 described herein, one of the coils 106, such as the first coil 106(1), may be coupled to the control 702 via the one or more members 704, and the other coil 106, such as the second coil 106(2), may be coupled to another mass via one or more additional members (not shown in FIG. 7), thereby allowing for independent and selective actuation of separate masses. This can allow for provisioning multiple different types of haptic feedback, as described herein.

Figure 8:
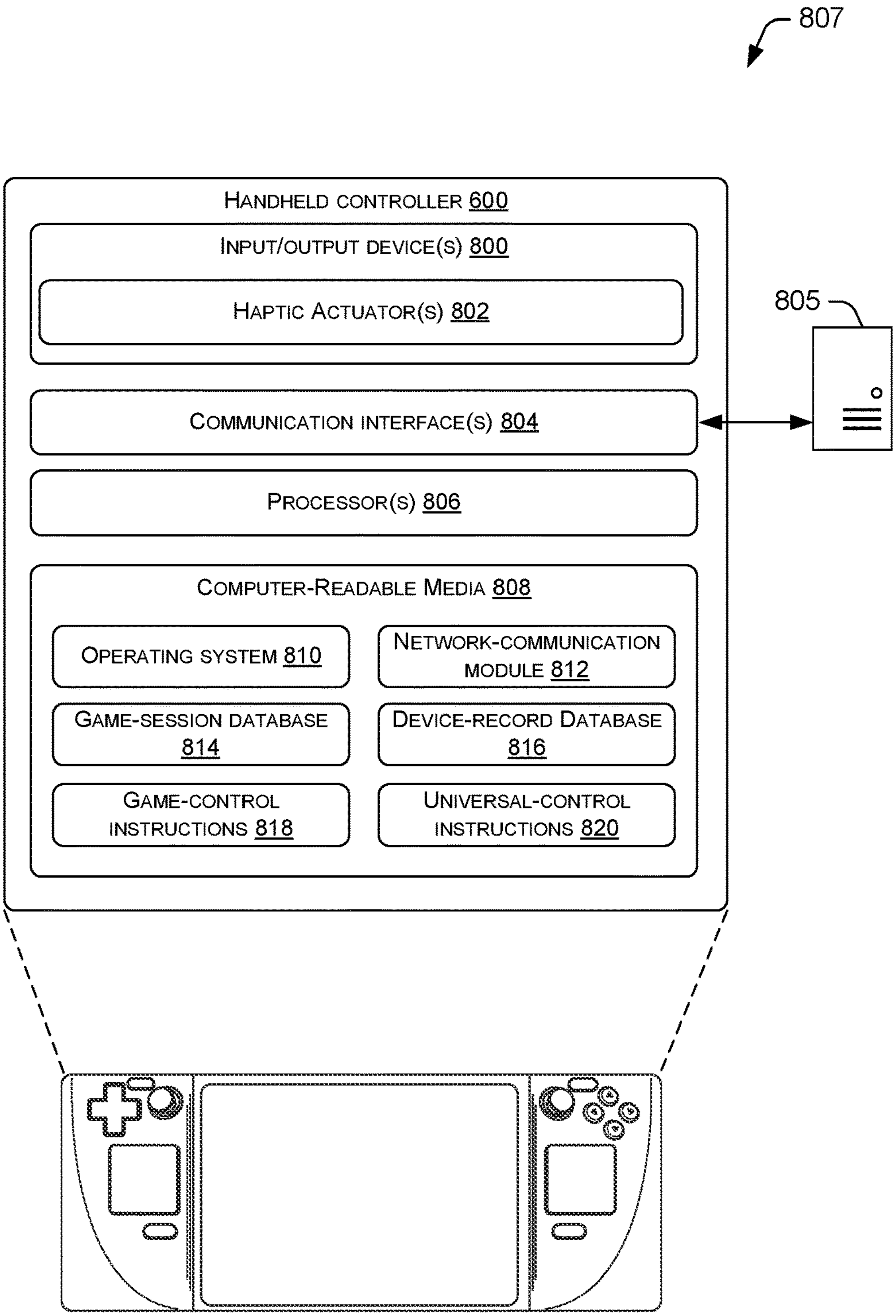
FIG. 8 illustrates example functional components of an example handheld controller, including, among other components, one or more haptic actuators to provide haptic feedback to a user of the handheld controller.

FIG. 8 illustrates example computing components of a controller 600. As illustrated, the controller 600 includes one or more input/output (I/O) devices 800, such as the controls described above (e.g., joysticks, trackpads, triggers, etc.), potentially any other type of input or output devices. For example, the I/O devices 800 may include one or more microphones to receive audio input, such as user voice input. In some implementations, one or more cameras or other types of sensors (e.g., inertial measurement unit (IMU)) may function as input devices to receive gestural input, such as motion of the handheld controller 600. In some embodiments, additional input devices may be provided in the form of a keyboard, keypad, mouse, touch screen (e.g., display 626), joystick, control buttons and the like. The input device(s) may further include control mechanisms, such as basic volume control button(s) for increasing/decreasing volume, as well as power and reset buttons.

The output devices, meanwhile, may include a display 626, a light element (e.g., LED), a haptic actuator(s) 802 to create haptic sensations and/or feedback, a speaker(s) (e.g., headphones), and/or the like. The haptic actuator(s) 802 may represent any suitable type of haptic actuator(s), including, without limitation, any of the haptic actuators described herein, such as the haptic actuator 700 of FIG. 7, and/or the multi-coil VCM 100 described herein. There may also be a simple light element (e.g., LED) to indicate a state such as, for example, when power is on and/or functionalities of the controller 600 (e.g., modes). While a few examples have been provided, the controller 600 may additionally or alternatively include any other type of output device.

In some instances, output by the one or more output devices may be based on input received by one or more of the input devices. For example, selection of a control may result in the output of a haptic response by a haptic actuator (s) 802 coupled to the control. In some instances, the output may vary based at least in part on a characteristic of a touch input on a touch sensor, such as the touch sensor associated with the control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the control may result in a first type of haptic output, while a tap on the control (detected by the touch sensor) may result in a second type of haptic output, while a hard press of the control may result in a third type of haptic output. In some examples, the output of a haptic actuator(s) 802 may be based on other criteria being met, such as events that occur within a game executing on the handheld controller 600 and/or on an external device (e.g., a game console, a game server, etc.). Additionally, certain controls or portions of the controls may be illuminated based on received inputs.

In addition, the handheld controller 600 may include one or more communication interfaces 804 to facilitate a wireless connection to a network and/or to one or more remote systems and/or devices 805 (e.g., a host computing device executing an application, a game console, etc.). The communication interfaces 804 may implement one or more of various wireless technologies, such as Wi-Fi, Bluetooth, radio frequency (RF), and so on. It is to be appreciated that the handheld controller 600 may further include physical ports to facilitate a wired connection to a network, a connected peripheral device, or a plug-in network device that communicates with other wireless networks.

In the illustrated implementation, the handheld controller 600 further includes one or more processors 806 and computer-readable media 808. In some implementations, the processors(s) 806 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 806 may possess its own local memory, which also may store program modules, program data, and/or one or more operating systems.

The computer-readable media 808 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 808 may be implemented as computer-readable storage media ("CRSM"), which may be any available physical media accessible by the processor(s) 806 to execute instructions stored on the computer-readable media 808. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 806.

Several modules such as instruction, datastores, and so forth may be stored within the computer-readable media 808 and configured to execute on the processor(s) 806. A few example functional modules are shown as stored in the computer-readable media 808 and executed on the processor(s) 806, although the same functionality may alternatively be implemented in hardware, firmware, or as a system on a chip (SOC).

An operating system module 810 may be configured to manage hardware within and coupled to the handheld controller for the benefit of other modules. In addition, the computer-readable media 808 may store a network-communications module 812 that enables the handheld controller to communicate, via the communication interfaces 804, with one or more other devices 805, such as a personal computing device executing an application (e.g., a game application), a game console, a remote server, or the like. The computer-readable media 808 may further include a game-session database 814 to store data associated with a game (or other application) executing on the controller or on a computing device to which the controller couples. The computer-readable media 808 may also include a device-record database 816 that stores data associated with devices to which the controller couples, such as the personal computing device, game console, remote server or the like. The computer-readable media 808 may further store game-control instructions 818 that configure the controller to function as a gaming controller, and universal-control instructions 820 that configure the handheld controller to function as a controller of other, non-gaming devices.

In some instances, some or all of the components (software) shown in FIG. 8 could be implemented on another computing device(s) 805 that is part of a controller system 807 including the controller 600. In such instances, the processes and/or functions described herein may be implemented by other computing devices 805 and/or the controller 600. By way of example, the controller 600 may couple to a host PC or console in the same environment, a computing device(s)/server and provide the device 805 with data indicating presses, selections, and so forth received at the controller 600. The controller 600, for example, may transmit data indicating touch inputs received at a trackpad of the controller 600 to the computing devices, and the computing devices may determine characteristics of the data and/or where the touch input is received on the controller 600 (or the control of the controller). The computing device 805 may then cause associated actions within a game or application to be performed. In another example, the computing device 805 may receive data indicating an amount of force of a press on a control and/or a touch of a control (e.g., a touch gesture), and based on the data, the computing device 805 may determine whether to actuate a haptic actuator(s) 802 and at what level (e.g., frequency) to provide the corresponding haptic output. However, while a few scenarios are described, the controller 600 and the computing device(s) 805 may communicatively couple with one another for transmitting and receiving data such that the controller 600, the computing device 805, and/or other devices of the controller system 807 may perform the operations and processes described herein.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A multi-coil voice coil motor (VCM) comprising:
a housing;
multiple concentric coils comprising:
a first coil disposed on a first support coupled to the housing, the first coil having a first diameter; and
a second coil disposed on a second support coupled to the housing, the second coil having a second diameter that is different than the first diameter,
wherein the first support and the second support are concentric tubes; and
a magnet coupled to the housing.

2. The multi-coil VCM of claim 1, wherein:
the magnet is fixed within the housing;
the multiple concentric coils are configured to move relative to the magnet; and
movement of the first coil is independent of movement of the second coil.

3. The multi-coil VCM of claim 1, wherein:
the second diameter is greater than the first diameter;
the second coil surrounds the first coil; and
the second coil is radially spaced a distance from the first coil.

4. The multi-coil VCM of claim 1, wherein the magnet comprises one or more portions of permanent magnetic material that surrounds the multiple concentric coils.

5. The multi-coil VCM of claim 4, wherein:
the second diameter is greater than the first diameter; and
the one or more portions of the permanent magnetic material are arranged in a substantially annular shape having a third diameter greater than the second diameter.

6. The multi-coil VCM of claim 1, wherein:

the first coil is configured to be driven within a first range of frequencies; and the second coil is configured to be driven within a second range of frequencies that is different than the first range of frequencies.

7. The multi-coil VCM of claim 1, wherein the multiple concentric coils are:

concentric with a point on an axis at a center of the housing, and at least partially overlap along the axis.

8. The multi-coil VCM of claim 1, wherein the housing comprises:

one or more first arms coupled to a bottom of the first coil or to a bottom of the first support and configured to suspend the first coil within the housing; and one or more second arms coupled to a top of the second coil or to a top of the second support and configured to suspend the second coil within the housing.

9. The multi-coil VCM of claim 8, wherein:

the one or more first arms comprises two first arms; and the one or more second arms comprises two second arms.

10. A haptic actuator comprising:

a housing;

a first coil disposed on a first support coupled to the housing;

a second coil disposed on a second support coupled to the housing, wherein the first coil is nested within the second coil, and wherein the first support and the second support are concentric tubes; and a magnet coupled to the housing.

11. The haptic actuator of claim 10, wherein:

the magnet is fixed within the housing; and the first coil and the second coil are each configured to move relative to the magnet.

12. The haptic actuator of claim 11, wherein movement of the first coil is independent of movement of the second coil.

13. The haptic actuator of claim 10, wherein the magnet comprises one or more portions of permanent magnetic material that surrounds the first coil and the second coil.

14. The haptic actuator of claim 13, wherein:

the second coil has a second diameter greater than a first diameter of the first coil; and the one or more portions of the permanent magnetic material are arranged in a substantially annular shape having a third diameter greater than the second diameter.

15. The haptic actuator of claim 10, wherein:

the first coil is configured to be driven within a first range of frequencies; and the second coil is configured to be driven within a second range of frequencies that is different than the first range of frequencies.

16. The haptic actuator of claim 15, wherein a highest frequency of the first range of frequencies is greater than a highest frequency of the second range of frequencies.

17. The haptic actuator of claim 10, wherein:

the second coil has a second diameter greater than a first diameter of the first coil;

the second coil surrounds the first coil; and the second coil is radially spaced a distance from the first coil.

18. The haptic actuator of claim 10, wherein the first coil and the second coil are:

concentric with a point on an axis at a center of the housing, and at least partially overlap along the axis.

19. The haptic actuator of claim 10, wherein the housing comprises:

one or more first arms coupled to a bottom of the first coil or to a bottom of the first support and configured to suspend the first coil within the housing; and one or more second arms coupled to a top of the second coil or to a top of the second support and configured to suspend the second coil within the housing.

20. The haptic actuator of claim 19, wherein:

the one or more first arms comprises two first arms; and the one or more second arms comprises two second arms.

* * * * *